March 12, 1963  H. LANSKI  3,080,657
PROTRACTOR FOR LAYOUT WORK
Filed July 3, 1958  2 Sheets-Sheet 1
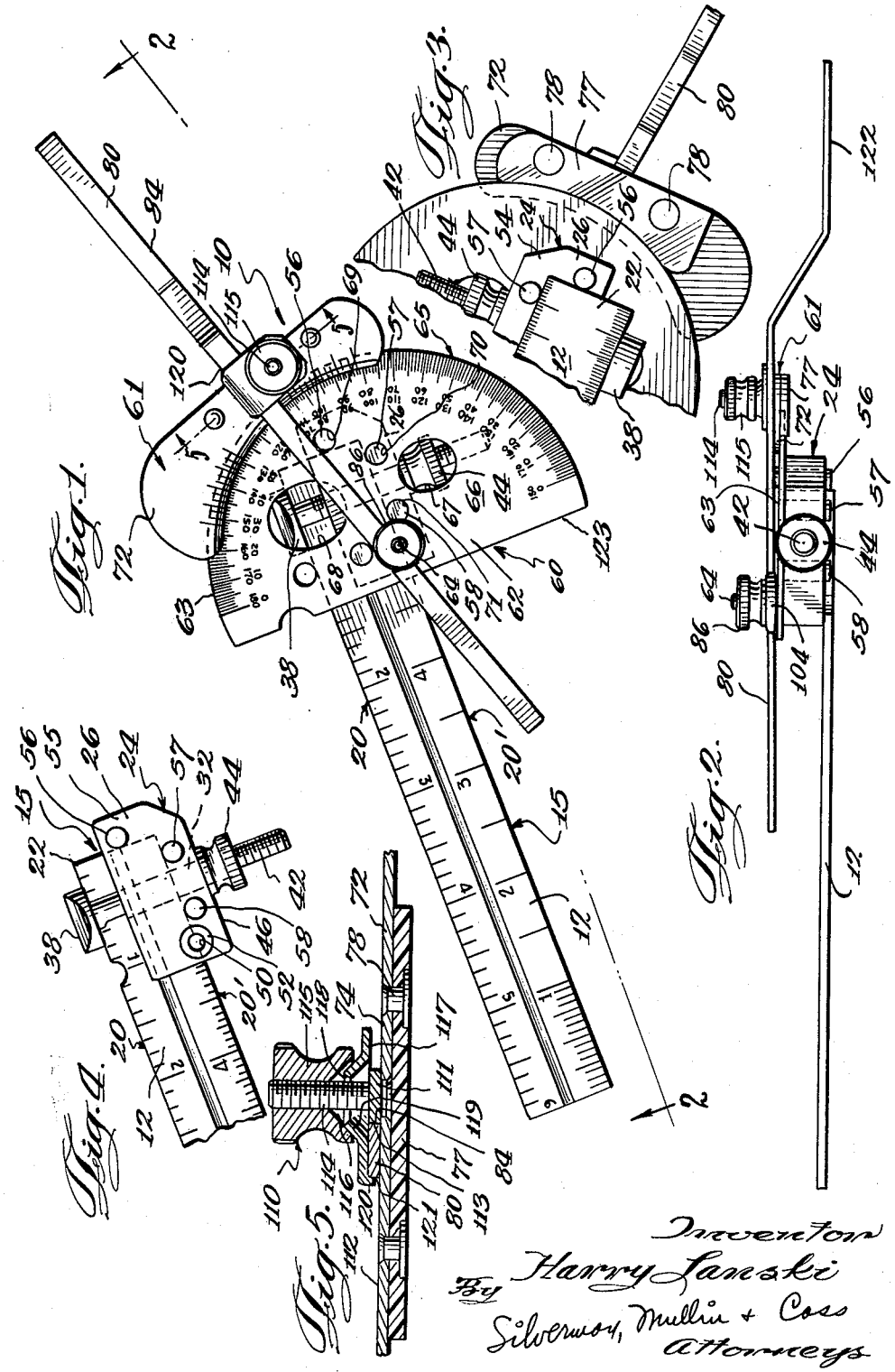
Inventor
Harry Lanski
By Silverman, Mullin & Coss
Attorneys

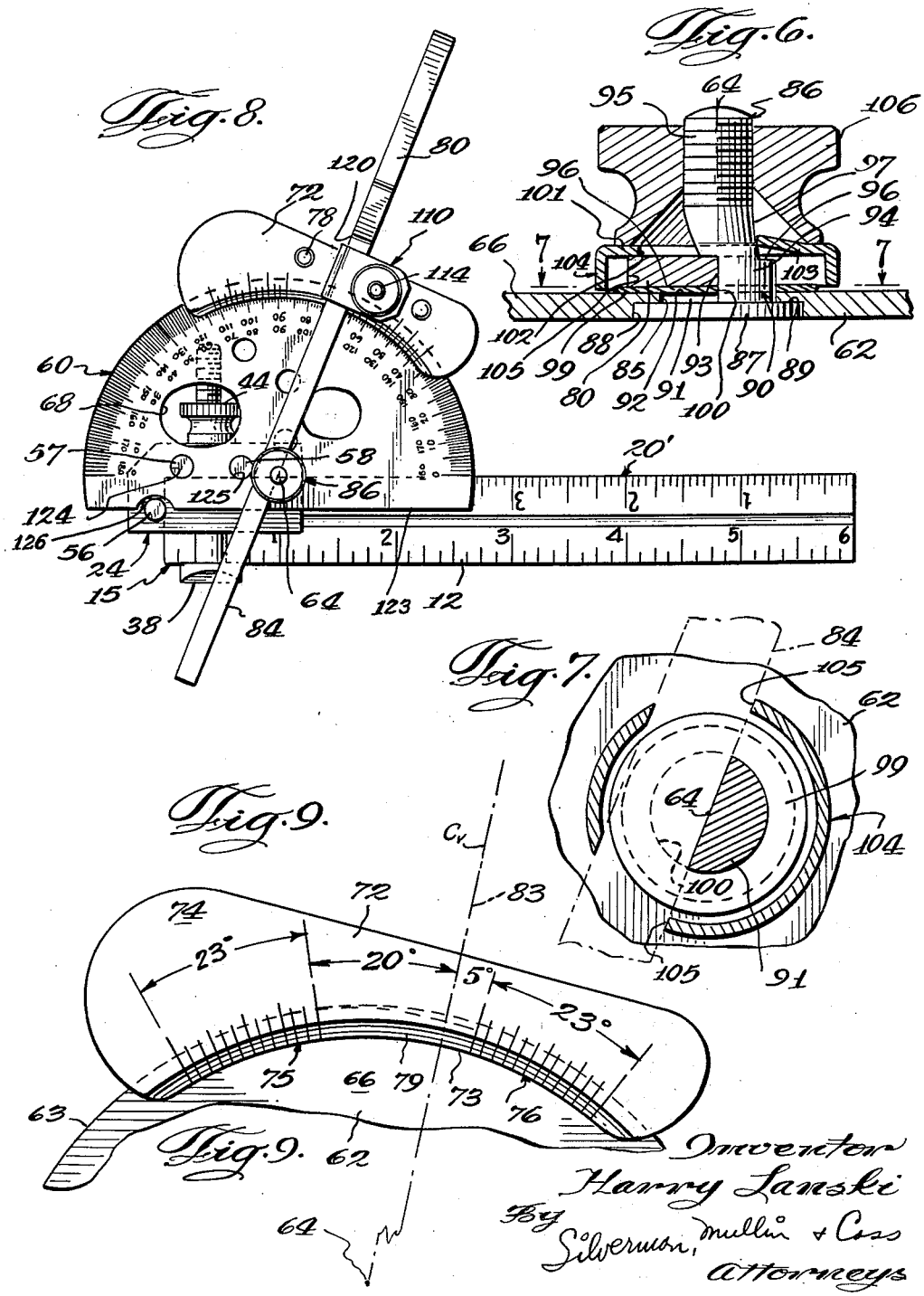

United States Patent Office 3,080,657
Patented Mar. 12, 1963

3,080,657
PROTRACTOR FOR LAYOUT WORK
Harry Lanski, 4880 Marine Drive, Chicago, Ill.
Filed July 3, 1958, Ser. No. 746,352
8 Claims. (Cl. 33—94)

This invention relates generally to marking instruments for use by tool and die makers or model makers, and more particularly, relates to a novel protractor with a vernier attachment to enable the layout of angles accurately and precisely.

The invention herein is an improvement upon and adjunct to another instrument for use in layout work which is described and claimed in my co-pending application Serial No. 632,766, filed January 7, 1957, now Patent No. 2,841,879, granted July 8, 1958, the herein application being a continuation-in-part of the said pending application.

In said pending application, there is described and illustrated a layout instrument which comprises a rule having a recess in the calibrated edge thereof aligned with a predetermined calibration and a layout guide clamp releasably secured on one end of the rule. The layout guide clamp has a guide hole and upstanding stop means which engage with the end of the rule to position the layout clamp with the center of the guide hole in registry with the calibration and calibrated edge and the recess aligned with the guide hole. The stop means, which in the particular embodiment illustrated comprised upstanding pins, were arranged to permit selective installation of the guide clamp properly positioned with relation to the calibrated edge, calibration and recess of the rule and the center of the guide hole. Clamping means were provided on the layout guide clamp for releasably securing the instrument to the rule. The device of said pending application is capable only of being used where the dimensions involved are measurable on the basis of Cartesian coordinates as distinguished from polar coordinates. In other words, unless dimensions involving an angle could be translated into readily measurable components at right to one another, the layout device of said copending application could not be employed.

While the herein invention relates to protractors, exclusive of other combinations used, probably a principal object of the invention is to provide an instrument which enables angles to be laid out easily and accurately in tool and die model making work, and this contemplates in most cases the use of the layout tool of said co-pending application in combination with the protractor of novel construction which is described hereinafter.

An important object of the invention is to provide a layout instrument which comprises a protractor head having novel means enabling same to be attached to a layout tool designed for use involving dimensions measurable on the basis of Cartesian coordinates so that an extremely accurate angle can be laid out relative to a reference point ascertained by means of the said layout tool.

A further object of the invention is to provide a novel vernier attachment for a protractor, including novel and highly efficient details of construction which render the device not only simple to manufacture and assemble but substantially foolproof in its use.

Some specific objects of the invention are the provision of a novel pivot for slidably securing a scale or blade to the protractor; a novel arrangement for providing bearing means for the arcuately movable vernier attachment; a novel clamping means for accurately positioning the blade or scale in the proper position relative to the vernier scale and biasing the same to such accurate position; other novel structural features which render the protractor extremely useful.

As in the case of other tools or instruments of this nature, the shapes, proportions and details which are not functionally related to the invention are capable of wide variations which depend upon the choice of the designer. It is feasible and, in fact, probably will be most usual for different constructions of the layout device embodying the invention to vary as to such shapes, proportion and details without in any way departing from the teachings of the invention.

In order to further a complete understanding thereof, there is set forth hereinafter and illustrated a preferred embodiment of the invention, the protractor being shown in combination with the layout tool of the said copending application, to illustrate the manner of using the same and as well to disclose the manner in which the two portions of the combination are associated.

In the drawings:

FIG. 1 is a top plan view of the protractor of the invention shown attached to the end of the layout tool of the said copending application and being applied to the laying out of an angle relative to a line normal to the long dimension of the scale of the layout tool.

FIG. 2 is a sectional view taken through the protractor along the line 2—2 of FIG. 1 and in the direction indicated.

FIG. 3 is a fragmentary bottom plan view of the protractor showing the arcuate bearing means for the vernier attachment.

FIG. 4 is a fragmentary bottom plan view of the layout tool alone to show the layout guide clamp in installed position on the rule.

FIG. 5 is a sectional view taken through the clamping means on the vernier attachment along the line 5—5 of FIG. 1 and in the direction indicated.

FIG. 6 is a median sectional view taken vertically through the novel pivot axis means for slidably securing the blade or scale on the protractor.

FIG. 7 is a sectional view taken along the line 7—7 of FIG. 6 and in the direction indicated.

FIG. 8 is a top plan view of the protractor of the invention shown attached to the end of the layout tool of the said copending application and arranged for the layout of an angle relative to a line parallel to the longitudinal dimension of the scale of the layout tool.

FIG. 9 is an enlarged plan view of the vernier scale and partially diagrammatic to illustrate the relation of the scale or blade of the protractor to the vernier scale.

Referring now to the drawings, in FIG. 1 there is illustrated my novel protractor with a vernier attachment operably associated with the layout marking tool of said copending application in a combination identified generally by the reference character 10. The combination 10 will be referred to hereinafter as the "combined instrument" where it is intended to connote an instrument which enables angles to be laid out relative to a line either normal to or parallel with the length of a linear scale. The layout marking tool of the copending application is designated generally by the reference character 15 and the protractor with a vernier attachment is designated generally 60.

Considering first the layout tool 15, same includes a metal rule 12 which may have each of the longitudinal edges thereof calibrated, such as in inches and fractions thereof, indicated respectively by the linear scales 20 and 20' etched or otherwise provided either on one or both surfaces of the rule. As is common, the scales 20 and 20' may be reversed with respect to the end 22 so that the numerical values of scale 20 become progressively larger receding from end 22 whereas the numerical values of scale 20' become progressively smaller. Releasably secured on the end 22 is the layout guide clamp 24, which preferably is formed of hardened metal. As explained in said co-pending application, the guide clamp 24 includes a bed plate or block 26 the length of which is greater than the smallest whole number calibration of said scales, which in this instance, would be one inch.

The clamp 24 carries means for securing the layout guide clamp on the rule end 22 comprising a long bolt, the shank 32 of which is loosely engaged through a suitable passageway in the block 26 for axial movement normal to the length of the block with the length of said shank being greater than the width of the block. One end of the shank has an enlarged jaw formation 38 rigid thereon exterior of the block and to prevent rotation of the shank relative to the block, the shank may be suitably squared or flattened along a portion of its length or the bore may be suitably formed or other well known means may be employed to achieve this function. The shank is threaded along the exposed portion 42 continuously to the opposite end thereof and mounted on said portion 42 is a movable clamping jaw member comprising a threaded thumb nut 44 which may be advanced and retracted relative the adjacent side face 46 of the block 26.

The block 26 is provided with a guide hole 50 reinforced by bushing 52 extending entirely through the same perpendicular to the length of said block. Both the upper and lower surfaces 54 and 55 respectively are provided with stop means as referred to in said co-pending application which comprise a plurality of upstanding abutments or protuberances selectively arranged on each of said surfaces for accurately positioning the layout clamp when installed so that the guide hole 50 is properly aligned as required. In the structure of said co-pending application, as in the herein application, said stop means are provided by a plurality of cylindrical pins 56, 57 and 58 of greater length than the thickness of the block 26 so that said pins protrude at each of their ends outwardly of the surfaces 54 and 55 respectively. The pins are rigidly secured perpendicular to the length of block 26 and the axis of shank 32 and are selectively located relative the center of guide hole 50 to achieve a predetermined registry of the center of hole 50 with a predetermined mark on the scale of the rule and the straight edge on which said scale is delineated. Thus, when the guide clamp is fastened on end 22 in conjunction with a straight edge of the rule 12, the center of guide hole 50 is in proper registry with a predetermined calibration of a scale and the edge of the rule on which said calibration is marked. It will be noted that in any installed position of the guide clamp 24, block 26 has ends of the stop pins upstanding from the surface thereof opposite that on which the end 22 of the rule is secured. The significance of this will be explained subsequently herein.

We consider now the protractor 60 having a vernier attachment designated generally 61. The protractor head is provided by a metal plate 62 having a semi-circular edge 63 which is calibrated, the center of curvature 64 lying on a base line in accordance with conventional protractor construction. A scale 65 for angular dimensions is provided on upper surface 66 of the protractor head either by etching or other well known means. Plate 62 also has a pair of enlarged openings 67 and 68 advantageously located to provide clearance for the clamping jaws 44 and 38 of the layout guide instrument 15 in the installed position of the protractor on the guide clamp 24. The plate 62 also has openings 69, 70 and 71 selectively arranged to permit mating engagement thereof respectively with the upstanding ends of pins 56, 57 and 58 permitting the protractor head to be laid flat upon the layout guide clamp 24 for layout of an angle relative to a line normal to the longitudinal dimension of the rule, as illustrated in FIG. 1. The openings 69, 70 and 71 also are arranged in complementary relation with the pins so that in the installed position of the protractor as seen in FIG. 1, the center of curvature 64 of the protractor edge 63 is in precise registry with the center of the guide hole 50 and with the pivot axis of the vernier attachment, as will now be explained.

As seen in FIG. 9, vernier 61 includes a metal plate member 72 having an arcuate edge 73 whose radius of curvature is complementary with that of edge 63 of the protractor head. To upper surface 74 of member 72 is applied a pair of vernier scales 75 and 76 each contiguous the curved edge 73 and on opposite sides of the guide line of the vernier identified by $C_v$ in FIG. 9. To the opposite surface of plate 72 is attached a bearing member 77 by suitable fastening means, such as rivets 78 the heads of which are flush with the upper surface 74, as seen in FIG. 5. As seen in FIG. 3, said bearing member is illustrated as a wafer of material suitable for providing an anti-friction connection between the vernier and protractor head, nylon or the like plastic material being successful in this respect. The member 77 has an arcuate edge 79 inwardly spaced from the curved edge 73 of the vernier plate 72 so that in the installed position of the vernier, edges 79 and 63 abut substantially along their entire extents. The curved edge 73 of the vernier will overlie the surface 66 of the protractor head by reason of the spaced relationship between curved edges 79 and 73 so that vernier scales 75 and 76 are positioned to be moved over the protractor scale 65 when the vernier is pivoted relative the protractor head. The bearing member will ride against edge 63 of the protractor head to reduce friction and wearing of said edge 63. It will be appreciated that the anti-friction bearing means between the protractor head and vernier may vary in shape within wide limits and that other bearing means such as rollers, for instance, would be feasible. However, the simple arcuate bearing member 77 is conducive to economy of manufacture.

Vernier scales 75 and 76 are particularly distinctive in the manner of their calibration. I have ascertained that a vernier for a protractor scale can be calibrated to achieve proper blending of the graduations of the vernier and protractor scales where the vernier scale extends over a twenty-three degree arc of the conventional protractor scale. This angular relationship for the vernier scale permits suitable blending of the graduations thereof with the degree calibrations of the protractor scale to permit ascertainment of fractional portions of a degree. I divide each vernier scale into twelve equal graduations so that the vernier scale is calibrated in five minute graduations. This permits each of the vernier graduations to blend with a protractor scale calibration when the end graduations of the vernier scale are each aligned with a degree calibration of the protractor scale.

Two vernier scales are employed so as to permit suitable measurements to be made at each extremity of the protractor scale. The scales 75 and 76 are identical except for their disposition relative the guide line $C_v$ of the vernier. As seen in FIG. 9, left hand scale 75 is located at a distance of twenty degrees to the left of said guide line and right hand scale 76 is located at a distance of five degrees to the right of said guide line. Thus, when measurements are to be made which require the vernier to be located at the right hand extremity of the protractor scale (as viewed in FIG. 1), it will be feasible to use the scale 76 and when measurements are to be made at the left hand extremity of the protractor scale, vernier scale 75 will be more convenient to employ. To facilitate reading of the vernier scales, arcuate edge 73 of the vernier has been beveled as shown at 79 and the graduations of the vernier scale extended over the beveled surface. The distances at which the vernier scales are placed relative said guide line may vary from that described and illustrated, the important point being the calibration of each scale over an arc of twenty three degrees of the protractor scale.

For purposes of pivoting the vernier attachment relative the protractor head, there is provided an elongate, flat blade or guide member 80 of rectilinear configuration which may or may not have dimension scales. The blade 80 is mounted for pivotal movement on the protractor head 62 about a pivot axis which is in precise registry with the center of curvature 64 of calibrated edge 63 and hence, both the pivot axis and center of curvature will be identified by the same reference character 64. It is required that one of the longitudinal edges of the blade also be in precise registry with pivot axis 64 and with the center or guide line of the vernier, such coincident relationship being illustrated by the broken line 83 in FIG. 9, said line 83 also corresponding to the longitudinal edge 84 (FIG. 1) of the blade with which the relationship above mentioned is established and guide line $C_v$. One may express the relationship between the longitudinal edge 84, the guide line $C_v$ and the vernier scales 75 and 76 by the expression that said edge is laterally spaced from the vernier scales while still passing through the pivot axis 64. The point 64 is shown in FIG. 3 displaced from its true location by reason of paper limitations.

Pivot axis 64 is provided by a structure which also serves to clamp blade 80 in position with the edge 84 thereof properly aligned. Protractor head 62 has an annular opening 85 therein the geometric center of which is coincident with pivot axis 64. A stud 86 is rotatably installed in said opening, said stud having a flat annular head 87 the diameter of which is larger than the diameter of opening 85. The head 87 is seated for rotary movement in a complementary countersunk portion 88 concentric with said opening 85 and opening to the opposite or rear surface of plate 62, said head being engaged in portion 88 with the outer surface of the head and rear surface of the plate 62 flush. Upstanding from the opposite surface 89 of the head 87 is a boss formation 90 having a cylindrical segment 91 the diameter of which is substantially identical to the diameter of the opening 85 and the length of which is complementary to the length of opening 85. A transverse groove or slot 92 is provided in boss 90 which opens at one end thereof to a surface of the boss formation, the closed end 93 of the groove being in precise registry with the center of opening 85. There thus is provided upstanding from segment 91 a substantially semi-cylindrical segment 94 having a flat surface which forms the closed end 93 of the groove 92 in precise registry with the center of opening 85 and pivot axis 64.

Extending upwardly from the semi-cylindrical segment 94 is a threaded shank 95 of reduced diameter to form the shoulder 96 at the upper end of segment 94. The axis of the shank 95 is coaxial with pivot axis 64. The shank 95 has a flattened surface 97 adjacent its juncture with segment 94 on a side of the shank laterally spaced radially from the closed end wall 93 of the groove 92, said surface being slanted upwardly toward the axis of shank 95.

The stud is installed in the opening 85 from the bottom surface of the protractor head to dispose head 87 in the countersunk portion 88 and cylindrical segment 91 in opening 85. The shank 95 will protrude upwardly normal to plate 62. A flat washer 99 having a semi-circular opening 100 of a radius substantially equal to the radius of opening 85 and semi-cylindrical portion 94 is first engaged over the shank 95 to dispose the washer flat upon upper surface 66 of the protractor head. The blade 80 is slidably engaged upon washer 99 received in the slot 92 the width of which is selected to be approximately equal to the thickness of the blade. Superimposed on blade 80 is a clamping washer 101 having an enlarged opening 102 therein through which shank 95 extends. The center of opening 102 is eccentric with respect to opening 85. Said washer 101 has a pressure finger 103 struck from the body thereof arranged to bear against the slanted surface 97 of the shank, said finger being bent slightly upwardly as seen in FIG. 6. The washer has an annular depending flange 104 which serves to achieve the clamping of blade 80 as desired. Said flange 104 has a pair of substantially identical aligned passageways 105 therethrough the width of which is selected to permit insertion of the blade 80 therethrough for sliding movement relative said washer 101. The aligned passageways 105 are located so that upon passage of the blade 80 therethrough, the edge 84 of the blade will be located juxtaposed or bearing against the inner end wall 93 of said slot 92.

A knurled tightening nut 106 is then engaged on the shank 95. As the nut is tightened, same presses downwardly upon the washer 101 causing the finger 103 to ride downwardly and outwardly on surface 97 to be pressed against the shoulder 96. The enlarged opening 102 will permit the washer 101 to be moved to the right as seen in FIG. 6 thereby causing the blade 80 to be biased against inner wall 93. In this arrangement, the guide edge 84 of said blade is maintained in precise registry with the pivot axis 64, the blade being permitted to rotate about axis 64 because the stud 86 is rotatably mounted in opening 85 of the protractor head.

The clamping means for accurately locating the blade 80 in proper position relative the vernier scales 75 and 76 is designated generally 110, as seen in FIG. 5. Such clamping means include said plate 72 of the vernier having an abutment 111 upstanding from the upper surface 112 thereof opposite that surface to which the bearing member 77 is attached. Said upstanding abutment may be provided by a stud secured in a suitable opening in the plate 72 or other well known means. Abutment 111 has a lateral edge 113 which is perpendicular to the surface 112 and precisely aligned with the guide line of the vernier. Rigid with said abutment is a threaded shank 114 perpendicular to plate 62 upon which is threadedly engaged a tightening nut 115, said nut being suitably knurled and shaped to permit convenient handling thereof. The bottom end face of the nut 115 has a generally conical depression 116. The blade 80 is positioned with its guide edge 84 against the edge 113 of said abutment. Co-operating with said nut 114 for clamping the blade 80 in this desired position is a clamping washer 117 formed of metal and having a passageway or opening 118 in the body portion thereof which is larger than the diameter of shank 114. The perimetric lip 119 surrounding said opening 118 is a substantially conical formation with the opening 118 provided at the apex thereof. The configuration of lip 119 is complementary with the configuration of depression 116 in the nut 115. At an edge thereof, the washer 117 has a depending hook or finger 120 the purpose of which is to engage the blade at the longitudinal edge 121 thereof opposite guide edge 84 and bias the blade against lateral edge 113 of said abutment. The washer 117 is interposed between the nut 115 and the abutment with shank 114 extending through the enlarged opening 118 and hook 120 engaging against edge 121 of the blade. As the nut 115 is tightening downwardly, the lip 119 will be received in the depression 116 of the nut. By reason of the complementary configurations of the mating surfaces of said lip 119 and depression 116 and enlarged opening 118, the washer 117 will be moved laterally to the right as viewed in FIG. 5 thereby causing the blade 80 to be biased against abutment 111 because of the hook 120 bearing inwardly against edge 121. There is thus achieved a self-centering of the washer 117 as the nut 115 is moved downwardly on the shank 114 which clamps the blade with the guide edge 84 thereof aligned with the center or guide line of the vernier and pivot axis 64.

It will be appreciated that the blade may be slid lengthwise by loosening nut 115 of the clamping means 110 and the nut 106. As seen in FIG. 2, the blade 80 may be provided with an elongate segment 122 offset downwardly from the clamped portion thereof and spaced from instrument so as to facilitate marking of angular measurements.

As seen in FIG. 1, installation of protractor 60 with the attached vernier 61 is achieved by engaging upstanding pins 56, 57 and 58 in the sockets provided by openings 69, 70 and 71 respectively protractor head 62 being arranged flat on block 26. The base line of the protractor which is parallel to the straight edge 123 thereof will be perpendicular to the scales 20 and 20' and the pivot axis 64 is in registry with the center of the guide hole 50 (FIG. 4) which as explained in said co-pending application is in registry with a selected calibration and a calibrated edge of rule 12, in the illustration this being along scale 20'. The blade 80 is clamped for pivotal movement about axis 64 and is clamped to the vernier with its guide edge 84 passing through the pivot axis 64 and the guide line of the vernier. A reading is obtained by ascertaining the position of the guide edge 84 relative the calibrations of scale 65 and then locating the graduation of the vernier scale being used, such as scale 75 or 76, which blends with a calibration of the protractor scale. Since each calibration of the vernier scale represents a five minute increment, ascertaining the vernier reading is simply done merely by counting the position of the blended graduation from the starting graduation of the vernier scale and multiplying by five to ascertain the number of minutes involved. A mark may be made by the operator along the guide edge 84 to locate the position on the work. It will be apparant that the vernier is readily and easily pivoted by pivoting the blade 80 to which it is attached about the pivot axis 64, the clamping means provided constantly maintaining the guide edge 84 of the blade 80 aligned with the pivot axis and guide line of the vernier.

Referring to FIG. 8, the combined instrument is illustrated wherein the protractor 60 is associated with the layout guide instrument 15 for laying out an angle relative to a line parallel to the longitudinal dimension of scale 20'. For this purpose, the protractor head 62 is provided with a pair of socket openings 124 and 125 suitably located for receiving the upstanding pins 57 and 58 respectively and the straight edge 123 of the protractor plate has a clearance notch 126 for the pin 56. The protractor head of FIG. 8 has been rotated ninety degrees in a clockwise direction from the position thereof illustrated in FIG. 1 and installed with the edge 123 parallel to the longitudinal dimension of rule 12 or scale 20'. The pivot axis 64 is aligned with the center of guide hole 50 and with the edge of the rule 12 along which scale 20' is laid out. It will be noted that for purposes of installing the protractor with attached vernier in either position of FIG. 1 or FIG. 8, it is not required to disassemble the layout guide instrument 15. The cooperation between the pins 56, 57 and 58 on the block 24 and the socket openings provided in the protractor head enables speedy and simple installation of the protractor instrument in either of said positions.

In conclusion, it should be realized that the protractor with attached vernier may be employed separately from the layout guide instrument 15 while still obtaining the advantages of the pivotal blade 80 having the vernier attachment associated therewith for arcuate movement over the arcuate scale of the protractor. The combined instrument has additional advantages arising from the cooperation between the layout guide 15 and the protractor 60 with attached vernier.

It is believed the invention has been described in sufficient detail to enable the skilled artisan to understand and practice the same. Minor departures in structure and arrangement of parts may occur to the skilled artisan without departing from the principles of the invention set forth in the claims hereto appended.

What it is desired to secure by Letters Patent of the United States is:

1. A marking instrument for layout of angles comprising, a protractor head having a semi-circular edge and a protractor scale calibrated along said edge, a vernier attachment pivotally mounted for movement relative said edge on a pivot axis coincident with the center of curvature of said calibrated edge, said vernier attachment having an arcuate inner edge and a vernier scale contiguous with said arcuate edge calibrated over a predetermined arc, the protractor scale and vernier scale being aligned for selective blending of graduations thereof for layout of desired angles, said vernier attachment having a guide member connected between the vernier attachment and the protractor head with said guide member pivotally connected for movement about said pivot axis and having a longitudinal edge thereof extending transversely across the vernier attachment laterally spaced from the vernier scale and passing through said pivot axis to permit selection of a desired angle, said vernier attachment being slidable along said semi-circular edge and having anti-friction bearing means engaging said semi-circular edge during said sliding movement.

2. An instrument as described in claim 1 in which said bearing means comprises an arcuate nylon member.

3. An instrument as described in claim 1 in which said vernier attachment comprises a plate member having a bearing member secured thereon in anti-friction engagement with the semi-circular edge of the protractor head.

4. An instrument as described in claim 1 in which said vernier attachment has means releasably securing said guide member biased in position wherein the longitudinal edge thereof extends through said pivot axis, said means comprising an abutment upstanding on a surface of the vernier attachment having an edge aligned with said pivot axis considered along said longitudinal edge, and a self-centering tightening device having a hook formation engaged with the guide member adapted to bias said longitudinal edge against said abutment edge upon tightening of said device.

5. A marking instrument for layout of angles relative a line in predetermined relation to the longitudinal dimension of a linear scale comprising, in combination: a protractor head having a calibrated semi-circular edge, a vernier attachment pivotally mounted on the protractor head for movement relative said calibrated edge on a pivot axis coincident with the center of curvature of said calibrated edge, a guide blade for laying out angles, means pivotally securing said blade to the protractor head at the pivot axis and means securing said blade to said vernier attachment, said vernier attachment having an arcuate inner edge and a vernier scale contiguous said edge aligned with the calibrations of said semi-circular edge for selective blending of graduations for layout of desired angles, a rule calibrated along an edge thereof, a layout guide clamp, means securing said guide clamp to one end of said rule said guide clamp having a guide hole the center of which is in registry with a predetermined calibration of the rule and the calibrated edge, means mounting said protractor head on the guide clamp with said pivot axis in registry with the center of guide hole.

6. An instrument as described in claim 5 in which said protractor head mounting means includes cooperating pin and socket means on said head and guide clamp for positioning the head on the guide clamp in said position of registry.

7. An instrument as described in claim 6 in which said pin and socket means are selectively located to permit alternative mounting of the protractor head wherein the base line of the protractor is either perpendicular to or parallel with said calibrated edge of the rule.

8. An instrument as described in claim 5 in which said guide blade has a longitudinal edge aligned with the pivot axis.

References Cited in the file of this patent

UNITED STATES PATENTS

| | | |
|---|---|---|
| 223,727 | Halley | Jan. 20, 1880 |
| 318,984 | Hedges | June 2, 1885 |
| 717,381 | Fregoso | Dec. 30, 1902 |
| 851,947 | Lalone | Apr. 30, 1907 |
| 1,268,620 | Renstrom | June 4, 1918 |
| 1,367,423 | Nowak | Feb. 1, 1921 |
| 2,409,849 | Grey | Oct. 22, 1946 |
| 2,733,972 | Diack | Feb. 7, 1956 |
| 2,841,879 | Lanski | July 8, 1958 |

FOREIGN PATENTS

| | | |
|---|---|---|
| 409,879 | France | Feb. 28, 1910 |
| 120,235 | Great Britain | Oct. 15, 1918 |